US012066044B2

(12) United States Patent
McClure

(10) Patent No.: US 12,066,044 B2
(45) Date of Patent: Aug. 20, 2024

(54) FASTENER SYSTEM

(71) Applicant: Centrix AeroSpace LLC, Kent, WA (US)

(72) Inventor: Travis McClure, Chelan Falls, WA (US)

(73) Assignee: CENTRIX AEROSPACE LLC, Kent, WA (US)

( * ) Notice: Subject to any disclaimer, the term of this patent is extended or adjusted under 35 U.S.C. 154(b) by 141 days.

(21) Appl. No.: 17/661,972

(22) Filed: May 4, 2022

(65) Prior Publication Data

US 2022/0373011 A1 Nov. 24, 2022

Related U.S. Application Data

(60) Provisional application No. 63/209,715, filed on Jun. 11, 2021, provisional application No. 63/191,828, filed on May 21, 2021.

(51) Int. Cl.
*F16B 35/06* (2006.01)
*F16B 13/06* (2006.01)
*F16B 19/10* (2006.01)

(52) U.S. Cl.
CPC .......... *F16B 13/06* (2013.01); *F16B 19/1036* (2013.01)

(58) Field of Classification Search
CPC F16B 19/109; F16B 19/1081; F16B 19/1036; F16B 13/06
USPC .......................................................... 411/403
See application file for complete search history.

(56) References Cited

U.S. PATENT DOCUMENTS

| 4,537,542 A * | 8/1985 | Pratt | F16B 19/109 24/607 |
|---|---|---|---|
| 8,585,337 B1 * | 11/2013 | Dang | H01R 13/74 411/347 |
| 2012/0230796 A1 * | 9/2012 | McClure | F16B 19/109 411/80.1 |
| 2013/0039716 A1 * | 2/2013 | McClure | F16B 33/002 411/80.1 |
| 2013/0084130 A1 * | 4/2013 | McClure | F16B 5/06 403/327 |
| 2017/0234348 A1 * | 8/2017 | McClure | F16B 19/109 411/49 |
| 2018/0209462 A1 * | 7/2018 | Niklewicz | B25B 31/005 |
| 2018/0281921 A1 * | 10/2018 | Mills | F16B 37/043 |
| 2020/0063782 A1 * | 2/2020 | Bansal | F16B 5/0208 |
| 2020/0290180 A1 * | 9/2020 | Palette | B25B 31/005 |
| 2020/0347867 A1 * | 11/2020 | Niklewicz | F16B 19/109 |

(Continued)

*Primary Examiner* — Gary W Estremsky
(74) *Attorney, Agent, or Firm* — McCoy Russell LLP

(57) ABSTRACT

A fastener is provided. The fastener includes a housing with a housing opening and a collet body at least partially enclosed within the housing, the collet body includes a crown having a crown opening with a threaded section and a leg that extends from the crown and including a foot. The fastener further includes a screw with a head positioned in the housing opening, an upper threaded section, and a lower unthreaded section, where the housing opening and the crown include a set of splined protrusions and a set of splined recesses mated with one another, where the sets of splined protrusions and recesses include ramps and are designed to permit the collet body and the screw to transition into a free-spin configuration, and where a spring is designed to exert a return force on the collet body or the screw when the fastener is in the free-spin configuration.

18 Claims, 3 Drawing Sheets

(56) References Cited

U.S. PATENT DOCUMENTS

2021/0062847 A1\*   3/2021   McClure ............... F16B 13/068
2021/0207639 A1\*   7/2021   McClure ............. F16B 13/0833

\* cited by examiner

FASTENER SYSTEM

CROSS-REFERENCE TO RELATED APPLICATION

The present application claims priority to U.S. Provisional Application No. 63/191,828, entitled "FASTENER SYSTEM," and filed May 21, 2021 and U.S. Provisional Patent Application No. 63/209,715, entitled "FASTENER SYSTEM," and filed Jun. 11, 2021. The entire contents of the above-listed applications are hereby incorporated by reference for all purposes.

FIELD

The present description relates generally to a fastener that is designed to clamp multiple workpieces and has free-spin functionality.

BACKGROUND AND SUMMARY

Many manufacturing fields use fasteners, such as blind fasteners, for securing multiple workpieces together. In end-use environments which pose component accessibility constraints, blind fasteners may be particularly effective. The aerospace industry has deployed blind fasteners to increase the efficiency of complex manufacturing processes. The manufacturing processes can involve componentry within the aircraft cabin as well as fuselage and wing assemblies. Certain blind fasteners have been designed to permit a stud to freely rotate in relation to a collet body when the fastener reaches the end of its travel during unclamping. The free rotation of the stud in relation to the collet body prevents a tool from over torqueing the stud during unclamping.

However, the inventor has recognized several drawbacks with previous blind fasteners. For instance, rethreading the stud into the collet body, to discontinue the free rotation of the stud and the collet body, may be demand axial pressure combined with forward torque of the stud to initiate reengagement during a clamping sequence. Other fasteners with free-spin capabilities have included a collet body with an outer diameter that is smaller than a housing sleeve which significantly decreases fastener strength.

Facing the aforementioned challenges, the inventor developed a fastener. The fastener includes a housing with a housing opening and a collet body at least partially enclosed within the housing. Further, the collet body includes a crown having a crown opening with a threaded section and a leg that extends from the crown. The fastener further includes a screw with a head positioned in the housing opening, an upper threaded section, and a lower unthreaded section. In the fastener, the housing opening and the crown include a set of splined protrusions and a set of splined recesses mated with one another. Further, in the fastener, the sets of splined protrusions and recesses include ramps and are designed to permit the collet body and the screw to transition into a free-spin configuration where the stud and the collet body freely rotate such that the collet body does not axially translate in relation to the housing. The fastener further includes a spring designed to exert a return force on the collet body when the fastener is in the free-spin configuration. The ramps and spring allow for smooth transitions into and out of the free-spin configuration.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to fasteners designed with free-spin functionality. Ramped surfaces in protrusions in either a housing or a collet body along with a spring are used to enable the fastener to smoothly and seamlessly transition into and out of the free-spin configuration.

Figure 1:
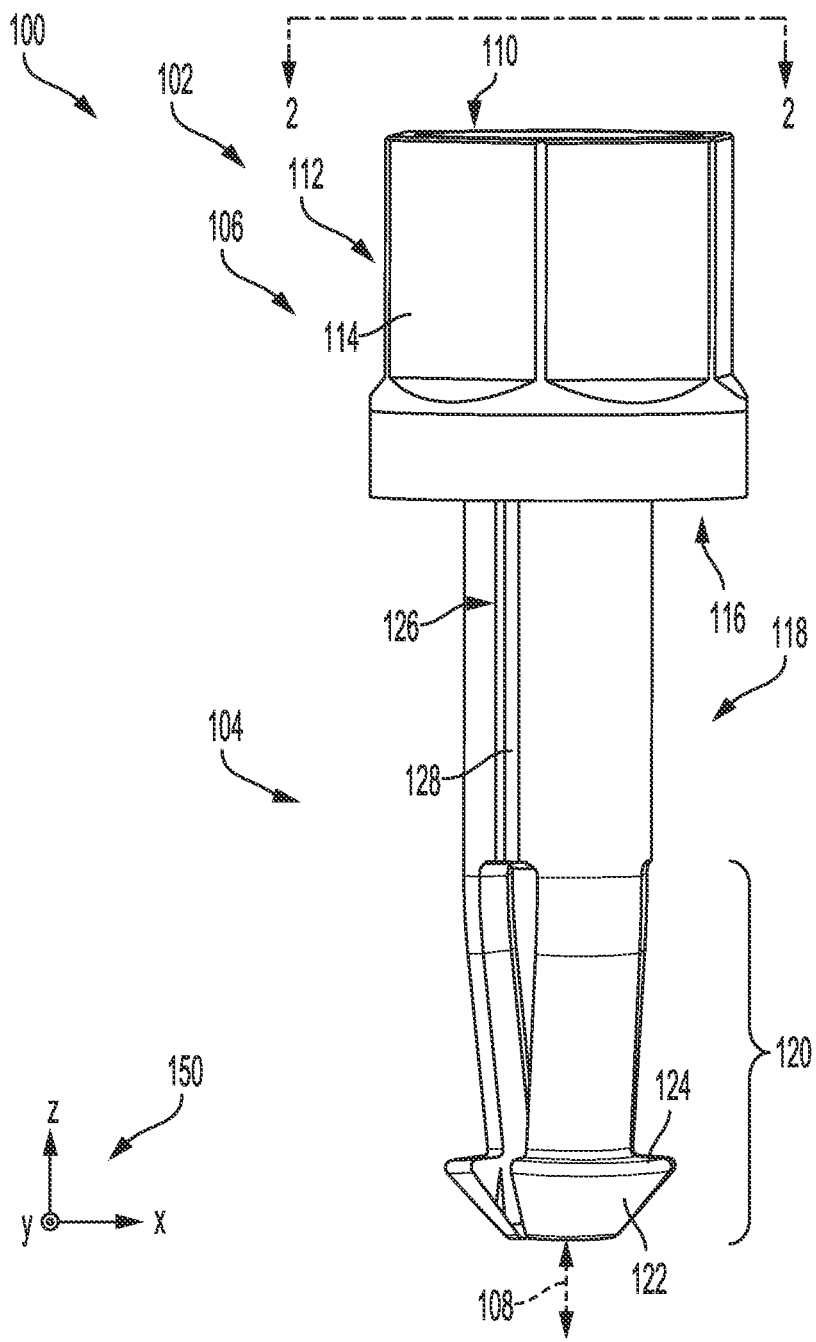
FIG. 1 shows a side view of a first embodiment of a fastener.

Turning to FIG. 1, a side view of a fastener system 100 with a fastener 102 is illustrated. The fastener 102 includes a collet body 104, a housing 106, and a screw obstructed from view in FIG. 1. Each of the components in the fastener 102 share a common central axis 108, shown in FIG. 1 as well as other figures where appropriate, for reference.

The housing 106 includes an upper side with an opening 110. An outer surface 112 of the housing 106 may include facetted surfaces 114 (e.g., polygonal surfaces) that may be designed to interact with a tooling apparatus. A lower side 116 of the housing 106 may function as an upper clamping surface.

The collet body 104 includes a crown 118 and legs 120 with feet 122. The legs 120 axially extend away from the crown 118. Surfaces 124 of the feet 122 may function as a lower clamping surface. The crow includes splined recesses 126 which may include axial sections 128. The axial sections 128 may traverse the crown to a lower side.

An axis system 150 is provided in FIG. 1 as well as FIGS. 2-27, for reference. The z-axis may be a vertical axis (e.g., parallel to a gravitational axis), the x-axis may be a lateral axis (e.g., a horizontal axis), and/or the y-axis may be a longitudinal axis, in one example. However, the axes may have other orientations, in other examples. Cutting plane 2-2, indicates the location of the cross-sectional views depicted in FIGS. 2 and 3.

Figure 2:
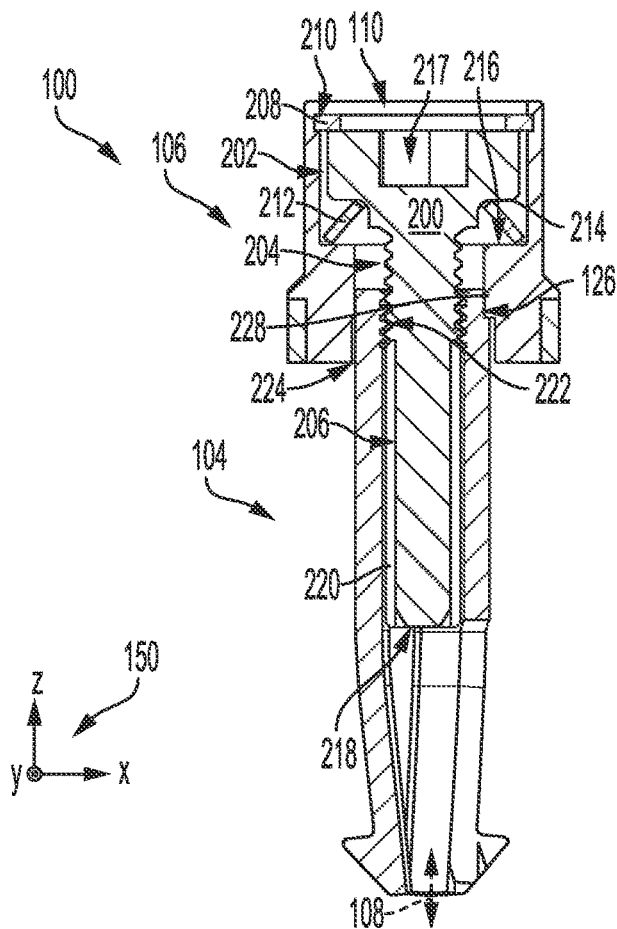
FIG. 2 shows a cross-sectional view of the fastener, depicted in FIG. 1.

FIG. 2 shows the fastener 102 with the collet body 104 and the housing 106. The screw 200 of the fastener is further shown. The screw 200 includes a head 202 at a proximal end, a threaded portion 204, and an unthreaded portion 206 at a distal end.

The screw head 202 is positioned in the opening 110 of the housing 106. Further, a retaining ring 208 (e.g., snap ring) is positioned in a detent 210 of the housing 106. The retaining ring 208 and a spring 212 (e.g., a Belleville washer, helical spring, wave spring, and the like) are positioned on axially opposing sides of the head 202. Specifically, the spring 212 is adjacent to a lower surface 214 of the head at an upper side and is adjacent to a housing lip 216 at a lower side. The housing 106 is designed to permit the screw head 202 to have axial play within the housing. The spring 212 is designed to exert an axial return force on the screw when the fastener is in the free-spin configuration to enable the fastener to smoothly transition out of the free-spin configuration and into the clamping configuration without the tool needing to apply a significant axial force to the stud. As such, the spring 212 is designed to compress while the blind fastener is in a free-spin configuration and decompress when the fastener transitions from the free-spin configuration to a clamping configuration.

The screw head 202 includes a tool interface 217. In the illustrated example, the tool interface 217 is a facetted recess (e.g., a polygonal recess such as a hexagonal recess). However, other suitable types of interfaces have been contemplated such as a slotted recess (e.g., a Phillips type recess), a splined recess, etc. The tool interface is designed to receive a driver (e.g., splined driver, hexagonal driver, etc.) that induces rotation (e.g., clockwise or counterclockwise rotation) of the screw 200 about the central axis 108.

The screw 200 further includes the threaded portion 204 that may extend from the head 202 to the unthreaded portion 206. Further, the unthreaded portion 206 may extend to a distal end 218 of the screw 200. However, other screw profiles have been contemplated. Further, a bushing 220 that mates with the unthreaded portion 206 of the screw may be included in the fastener 102. In one example, an outer diameter of the bushing and an outer diameter of the threaded portion 204 of the screw may be substantially equivalent. However, in other examples, the outer diameter of the bushing may be less than the outer diameter of the threaded section. Additionally, the threaded portion 204 of the screw 200 mates with a threaded section 222 of the collet body 104. Rotation of the screw in a first rotational direction induces fastener clamping and rotation of the screw in a second rotational direction, opposite the first direction, induces fastener unclamping.

Further, the collet body 104 mates with a lower opening 224 in the housing 106. Specifically, the set of splined recesses 126 in the collet body 104 mate with a set of splined protrusions 228 in the housing 106. The sets of splined recesses 126 and splined protrusions 228 function in tandem to permit the collet body 104 to axially translate in relation to the housing 106. Additionally, the sets of splined recesses and protrusions function to permit the collet body 104 to disengage from the housing 106 during unclamping operation when the screw is at the end of its travel. In this way, the fastener 102 is designed with free-spin functionality. While the fastener is in the free-spin configuration, the screw 200 and the collet body 104 freely rotate with regard to the housing and the collet body does not axially translate in relation to the housing during screw rotation. This free-spin-functionality may prevent a tool from over torqueing the stud during unclamping. Further, the splined recesses and splined protrusions permit the entry and exit from the free-spin configuration to be smoothly and efficiently carried out.

Figure 3:
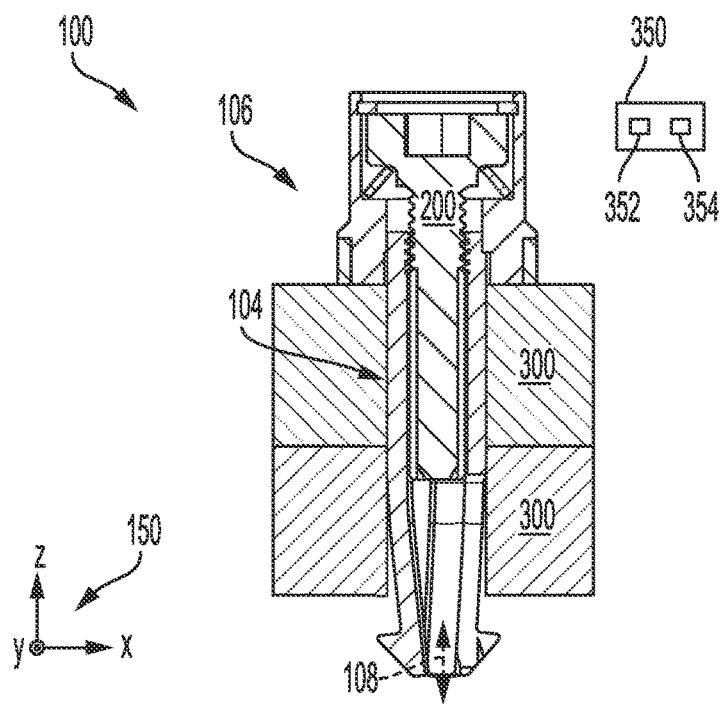
FIG. 3 shows a cross-sectional view of the fastener, depicted in FIG. 1, in a workpiece.

FIG. 3 shows the fastener 102 inserted into openings in adjacent workpieces 300. The fastener 102 is shown in a clamping configuration. To transition to the clamping configuration from the free-spin configuration, an axial downward force may be applied to the screw 200 while it is rotated. In this way, the fastener may exit the free-spin configuration to allow a clamping sequence to be carried out. Conversely, to place the fastener in the free-spin configuration the screw is rotated in the opposite direction and at the end of the travel of the collet body and the housing the splines disengage and the collet body aligns with a counterbore. In the counterbore, the collet body and the screw freely spin in relation to the housing.

Additionally, the components of the fastener 102 may be constructed out of a similar material such as metal (e.g., steel, aluminum, etc.), a polymer, etc., in one example. However, in other examples, the screw 200, housing 106, and/or collet body 104 may be constructed out of different materials. For instance, the housing may be constructed out of aluminum while the collet body 104 may be constructed out of a more spring biased material, such as steel. Moreover, the materials used to construct the different components in the fastener system may be chosen based on end use requirements. It will be appreciated that for structural applications (e.g., large load bearing structures) the fastener system may be constructed out of steel.

FIG. 3 also shows an automated tooling apparatus 350 that may be used to manipulate the fastener system and induce fastener clamping and unclamping. However, it will be appreciated that the fastener may be manually clamped and unclamped, in other instances. The tooling apparatus 350 may include a processor 352 and memory 354 storing instructions executable by the processor. The automated tooling apparatus 350 may further include tooling attachments, arms, carriages, etc., for manipulating the fastener.

Figure 4:
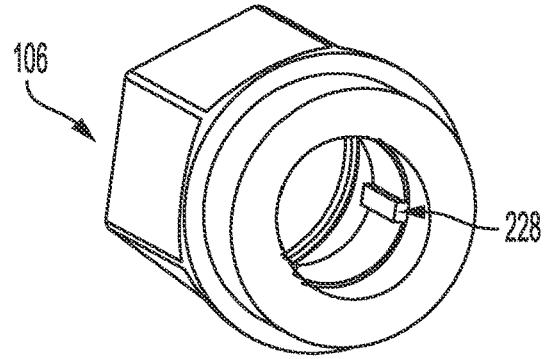
FIGS. 4-6B show additional views of the first embodiment of the fastener, shown in FIG. 1, and its components.

FIG. 4 shows a detailed view of the housing 106. The splined protrusions 228 in the housing are illustrated. The housing further includes a counterbore which is not splined and permits the collet body and the screw to freely rotate when in the free-spin configuration. The housing as depicted does not include a sleeve below the body. Specifically, the housing does not include a sleeve that extends below the upper clamping surface.

Figure 5:
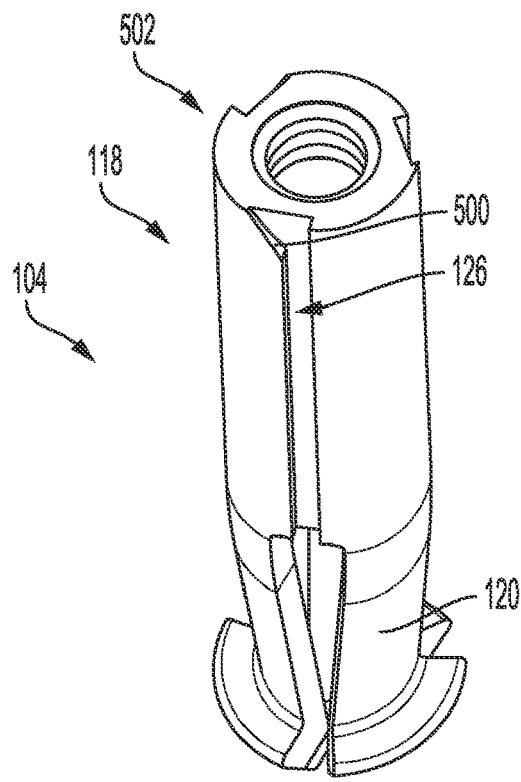

FIG. 5 shows a detailed view of the collet body 104 with the splined recesses 126. As shown, the splined recesses include ramped surfaces 500 at an upper portion to allow the fastener to transition into and out of the free-spin configuration. The splined recesses 126 may extend from the crown 118 to the legs 120. Further, the ramped surfaces 500 extend to a top side 502 of the collet body 104.

Figure 6A:
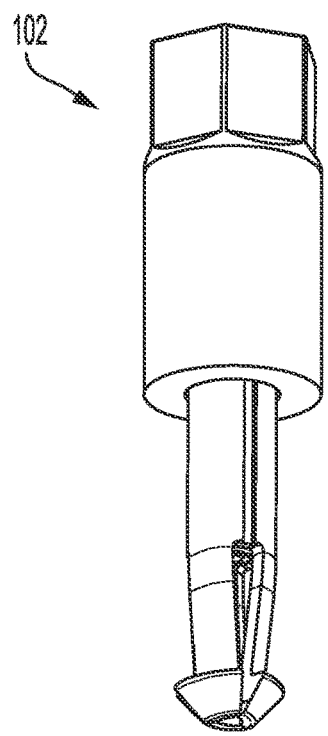
Figure 6B:
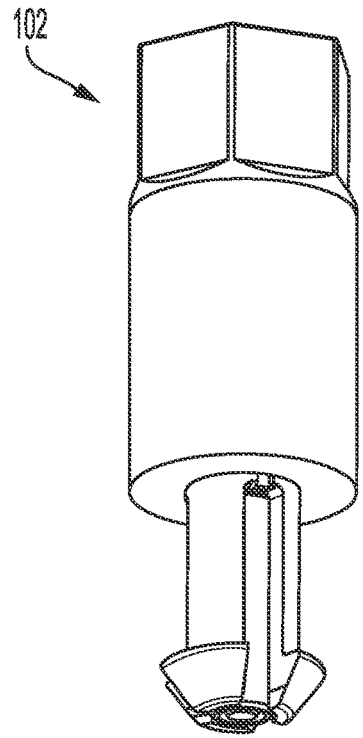

FIGS. 6A-6B illustrate the fastener 102 in a clamped and unclamped configuration. As shown, the collet body axially retracts into the housing during fastener clamp-up.

The present disclosure encompasses the fastener embodiments disclosed in U.S. Provisional Patent Application No. 63/191,828 entitled "FASTENER SYSTEM" filed May 21, 2021 and U.S. Provisional Patent Application No. 63/209, 715 filed Jun. 11, 2021 entitled "FASTENER SYSTEM." The disclosures of each of the above-cited U.S. Provisional Patent Applications are incorporated by reference herein.

FIGS. 1-6B show example configurations with relative positioning of the various components. Further, FIGS. 1-6B are drawn approximately to scale. However, other relative dimensions may be used in other embodiments. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention will further be described in the following paragraphs. In one aspect, a fastener is provided that comprises a housing including a housing opening; a collet body at least partially enclosed within the housing, the collet body including: a crown having a crown opening with a threaded section, and a leg extending from the crown and including a foot; and a screw with a head positioned in the housing opening, an upper threaded section, and a lower unthreaded section; wherein the set of splined protrusions and the set of recesses are designed to permit the collet body and the screw to transition into a free-spin configuration where the screw and the collet body freely rotate such that the collet body does not axially translate with regard to the housing.

In another aspect, a fastener is provided that comprises a housing including a housing opening; a collet body at least partially enclosed within the housing, the collet body including: a crown having a crown opening with a threaded section; and a leg extending from the crown and including a foot; and a screw with a head positioned in the housing opening, an upper threaded section, and a lower unthreaded section; wherein the collet body and the housing include a free-spin feature that permits the collet body and the screw to freely rotate in relation to the housing in a free-spin configuration and the screw head is designed with axial play to allow the fastener to transition into and out of the free-spin configuration.

In another aspect, a fastener is provided fastener that comprises a housing including a housing opening; a collet body including: a crown having and outer surface that mates with the housing opening and a threaded inner opening; and a leg extending from the crown and including a foot; and a screw comprising: a threaded section designed to threadingly engage with the threaded inner opening; and a smaller diameter free-spin section; a retaining ring arranged in the housing opening and axially capturing a head of the screw without axial play; and a spring positioned within the housing opening between a distal end of the opening and the collet body crown.

In another aspect, a blind fastener is provided that comprises a housing including a housing opening; a collet body including: a crown having and outer surface that mates with the housing opening and a threaded inner opening; and a leg extending from the crown and including a foot; a screw comprising: a threaded section designed to threadingly engage with the threaded inner opening; and a smaller diameter unthreaded free-spin section; a retaining ring arranged in the housing opening and axially capturing a head of the screw without axial play; and a spring positioned within the housing opening between a distal end of the opening and the collet body crown and designed to compress while the blind fastener is in a free-spin configuration and decompress when the fastener transitions from the free-spin configuration to a clamping configuration.

In any of the aspects or combinations of the aspects, the outer surface of the crown may be facetted and include planar faces.

In any of the aspects or combinations of the aspects, the spring may be a helical spring.

In any of the aspects or combinations of the aspects, the smaller diameter free-spin section may be unthreaded.

In any of the aspects or combinations of the aspects, the smaller diameter free-spin section may be axially positioned between two lengths of the threaded section of the screw.

In any of the aspects or combinations of the aspects, the retaining ring may be a snap ring.

In any of the aspects or combinations of the aspects, the housing opening may include the splined protrusions and the crown includes the splined recesses.

In any of the aspects or combinations of the aspects, the recesses in the crown may include axial sections that extend from ramped surfaces to the leg.

In any of the aspects or combinations of the aspects, the housing opening may include the recesses and the crown may include the splined protrusions.

In any of the aspects or combinations of the aspects, ramped surfaces in the splined protrusions may extend to a top side of the collet body.

In any of the aspects or combinations of the aspects, the fastener may further comprise a retaining ring positioned above an upper side of the screw head and a spring positioned below a lower side of the screw head.

In any of the aspects or combinations of the aspects, the retaining ring may be a snap ring.

In any of the aspects or combinations of the aspects, the splined protrusions may include an upper surface at a top side of the collet body, a lower surface arrange parallel to the upper surface, and a side surface arranged perpendicular to the upper and lower surfaces.

In any of the aspects or combinations of the aspects, the spring may be positioned below a head of the screw.

In any of the aspects or combinations of the aspects, the spring may be positioned below the crown of the collet body.

In any of the aspects or combinations of the aspects, the spring may be a Belleville washer.

It will be appreciated that the configurations disclosed herein are exemplary in nature, and that these specific embodiments are not to be considered in a limiting sense, because numerous variations are possible. For example, the above technology can be applied to a broad range of manufacturing fields such as the aerospace industry, the construction industry, the maritime industry, etc. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fastener comprising:
   a housing including a housing opening;
   a collet body at least partially enclosed within the housing, the collet body including:
   a crown having a crown opening with a threaded section; and
   a leg extending from the crown and including a foot;
   a screw with a head positioned in the housing opening, an upper threaded section designed to threadingly engage with the threaded section of the collet body, and a lower unthreaded section;
   wherein the housing opening and the crown include a set of splined protrusions and a set of splined recesses mated with one another; and
   wherein the sets of splined protrusions and recesses include ramps and are designed to permit the collet body and the screw to transition into a free-spin configuration where the screw and the collet body freely rotate such that the collet body does not axially translate in relation to the housing; and
   a spring designed to exert a return force on the collet body when the fastener is in the free-spin configuration.

2. The fastener of claim 1, wherein the housing opening includes the set of splined protrusions and the crown includes the set of splined recesses.

3. The fastener of claim 2, wherein the set of splined recesses in the crown include axial sections that extend from ramped surfaces to the leg.

4. The fastener of claim 1, wherein the housing opening includes the set of splined protrusions.

5. The fastener of claim 4, wherein a plurality of ramped surfaces in the set of splined recesses extend to a top side of the collet body.

6. The fastener of claim 1, further comprising:
   a retaining ring positioned above an upper side of the screw head; and
   a spring positioned below a lower side of the screw head.

7. The fastener of claim 6, wherein the retaining ring is a snap ring.

8. A blind fastener comprising:
   a housing including a housing opening;
   a collet body at least partially enclosed within the housing, the collet body including:
   a crown having a crown opening with a threaded section; and
   a leg extending from the crown and including a foot; and
   a screw with a head positioned in the housing opening, an upper threaded section, and a lower unthreaded section;
   wherein the collet body and the housing include a free-spin feature that permits the collet body and the screw to freely rotate in relation to the housing in a free-spin configuration and the screw head is designed with axial play to allow the blind fastener to transition into and out of the free-spin configuration;
   a spring designed to exert a return force on the collet body when the blind fastener is in the free-spin configuration.

9. The blind fastener of claim 8, wherein the spring is positioned below a head of the screw.

10. The blind fastener of claim 8, wherein the spring is positioned below the crown of the collet body.

11. The blind fastener of claim 8, wherein the spring is a Belleville washer.

12. A fastener comprising:
    a housing including a housing opening;
    a collet body including:
    a crown having an outer surface that mates with the housing opening and a threaded inner opening; and
    a leg extending from the crown and including a foot;
    a screw comprising:
    a threaded section designed to threadingly engage with the threaded inner opening; and
    a smaller diameter section;
    a retaining ring arranged in the housing opening and axially capturing a head of the screw without axial play; and
    a spring positioned within the housing opening between a distal end of the housing opening and the collet body crown;
    wherein the spring is designed to compress while the blind fastener is in a free-spin configuration and decompress when the fastener transitions from the free-spin configuration to a clamping configuration.

13. The fastener of claim 12, wherein the outer surface of the crown is facetted.

14. The fastener of claim 12, wherein the spring is a helical spring.

15. The fastener of claim 12, wherein the smaller diameter section is unthreaded.

16. The fastener of claim 15, wherein the smaller diameter section is axially positioned between two lengths of the threaded section of the screw.

17. The fastener of claim 12, wherein the retaining ring is a snap ring.

18. The fastener of claim 12, wherein the fastener is a blind fastener.

* * * * *